Jan. 31, 1950 J. N. WALTER 2,496,186

VOICE-CONTROLLED TWO-WAY TELEPHONE SET

Filed Nov. 29, 1947 2 Sheets-Sheet 1

INVENTOR
J. N. WALTER
BY
Earl C. Laughlin
ATTORNEY

Jan. 31, 1950 J. N. WALTER 2,496,186

VOICE-CONTROLLED TWO-WAY TELEPHONE SET

Filed Nov. 29, 1947 2 Sheets-Sheet 2

INVENTOR
J. N. WALTER
BY
Earl C. Laughlin
ATTORNEY

Patented Jan. 31, 1950

2,496,186

UNITED STATES PATENT OFFICE 2,496,186

VOICE-CONTROLLED TWO-WAY TELEPHONE SET

James N. Walter, East Elmhurst, N. Y., assignor to Bell Telephone Laboratories, Incorporated, New York, N. Y., a corporation of New York Application November 29, 1947, Serial No. 788,856

7 Claims. (Cl. 179—1)

The invention relates to two-way signal transmission systems, and particularly to circuits for controlling the direction and volume of signals transmitted over such systems.

The invention is broadly applicable to a two-way signal transmission system including, at least at its terminals, separate one-way amplifying paths for the signals transmitted in opposite directions, with associated signal-controlled switching circuits for controlling the loss values of variable attenuation networks or other loss devices in the two amplifying paths so as to change the direction and control the volume of the transmitted signals. It is especially applicable to, although not limited to, a voice-controlled two-way telephone set, for example, a voice-controlled operator's two-way telephone set, comprising separate voice signal transmitting and receiving paths each including wave amplifying means, connected to two-way line terminals, the transmitting path normally including a high loss and the receiving path low loss so that the set is normally conditioned for signal receiving only, and a control circuit connected to the input of the transmitting path in front of the normally high loss device therein, which is operatively responsive to the applied voice currents of the operator, when she talks, to insert a high loss in the receiving path and remove the normal high loss from the transmitting path, so as to allow the operator to talk with a distant party over the associated two-way line while preventing excessive reception in the operator's receiver.

An object of the invention is to improve the operation of such two-way signal transmission systems or telephone sets.

A more specific object is to reduce objectionable transient disturbances in the signal transmission paths of such systems or sets caused by the switching of signal transmission from one direction to the other.

These objects are attained in accordance with the invention mainly by the provision of means associated with the signal-controlled switching circuit for making part of it relatively fast operating when switching from the transmitting to the receiving condition and relatively slow releasing when performing the reverse switching operation.

The various objects and features of the invention are explained in more detail in the following complete description to be read in conjunction with the accompanying drawings, in which.

Figure 1:
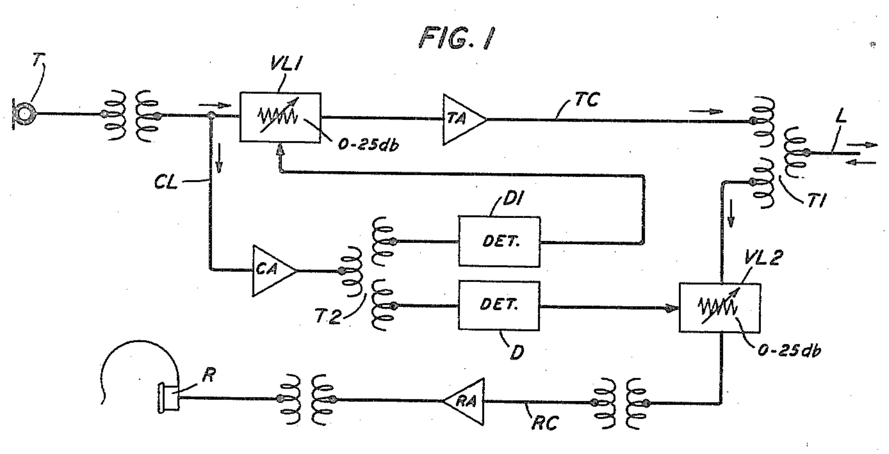
Fig. 1 is a functional schematic of a portion of a two-way telephone system, of the type to which the invention is applicable.

The two-way telephone circuit shown in the functional single line schematic of Fig. 1 comprises a voice signal transmitting circuit TC including the telephone transmitter T and the transmitting amplifier TA, and a voice signal receiving circuit RC including the telephone receiver R and the receiving amplifier RA, connected through the three-winding transformer T1 to the two-way line L. A vario-losser or variable loss pad VL1 is inserted in the transmitting circuit TC in front of the amplifier TA, and a similar vario-losser or variable loss pad VL2 is inserted in the receiving circuit RC in front of the amplifier RA. The common control circuit CL for the vario-lossers or variable loss pads VL1 and VL2 has its input connected across the transmitting circuit TC in front of the vario-losser pad VL1. The control circuit CL includes a control amplifier CA in its input and two separate detector circuits D1 and D having their inputs connected to the output of the control amplifier CA and their outputs respectively arranged to control the vario-losser pad VL1 in the transmitting circuit TC and the vario-losser pad VL2 in the receiving circuit RC.

The vario-losser pad VL1 is normally biased or adjusted so that, in the absence of signal transmission in the transmitting circuit TC, it will provide its maximum loss, say, 25 decibels, in the latter circuit, and the vario-losser pad VL2 is normally biased or adjusted so that, in the absence of signal transmission in the transmitting circuit TC, it will provide its minimum loss, say zero or approximately zero decibels, in the receiving circuit RC. With the telephone circuit in this normal condition, the normal high loss of the vario-losser pad VL1 will attenuate the room noise impressed on the input of the transmtting circuit so that the amplified portion thereof diverted into the receiving circuit will not be of sufficient amplitude to mask signals received by that circuit from the line L. The voice signals of a distant party incoming over the two-way line L and impressed by transformer T1 on the receiving circuit RC, while the operator's set is in this condition, will pass through the vario-losser pad VL2 with little attenuation and after amplification in the receiving amplifier RA will be heard in the operator's receiver R. A portion of the incoming voice signals reproduced by receiver R will be fed back as sidetone from the receiver R to the transmitter T, and will be impressed by the latter on the transmitting circuit TC. This sidetone energy, however, will be largely dissipated in the vario-losser pad VL1 in front of the transmitting amplifier TA, because of the normal high loss condition of the former, so that the amount of the sidetone passing through the transformer T1 into the receiving circuit RC will be insufficient to appreciably distort the received voice signals.

If, however, the operator talks into her transmitter T, a portion of the resulting voice currents in the output thereof will be diverted into the control circuit CL in which it will be amplified by the control amplifier CA in accordance with its gain setting. The resulting amplified voice currents will be divided by the transformer T2 between the detectors D1 and D and will be detected thereby. The detected voice currents in the output of the detector circuit D1 will be applied to the vario-losser pad VL1 in transmitting circuit TC in such manner as to bias or cause adjustment of that vario-losser pad to its minimum loss condition, say, zero or nearly zero decibels, and the detected voice currents in the output of the detector circuit D will be applied to the vario-losser pad VL2 in the receiving circuit RC in such manner as to bias or adjust the latter vario-losser pad to its high loss condition, say, 25 decibels. This will allow the operator's voice currents from the transmitter T to be transmitted through the vario-losser pad VL1 with little attenuation, and, after amplification by the transmitting amplifier TA in accordance with its gain setting, to be impressed by the transformer T1 on the line L over which it will be transmitted to the distant party. The portion of the operator's outgoing voice currents passing through transformer T1 to the receiving circuit RC will be sufficiently attenuated by the now high loss of the vario-losser pad VL2 in that circuit so as to prevent, while the operator continues to talk, excessive reception in her receiver R. For the assumed losses of the circuits TC and RC including the vario-losser pads VL1 and VL2, and the selected gains of amplifiers TA and RA, a net attenuation of 15 decibels exists between the transmitter T and the receiver R. When the operator ceases talking so as to reduce the currents in the outputs of the detectors D1 and D2 in the control circuit CL to zero, the vario-losser pad VL1 in the transmitting circuit TC will restore to its normal high loss condition and the vario-losser pad VL2 in the receiving circuit RC will restore to its normal low loss condition to maintain a net sidetone attenuation of 15 decibels.

Figure 2:
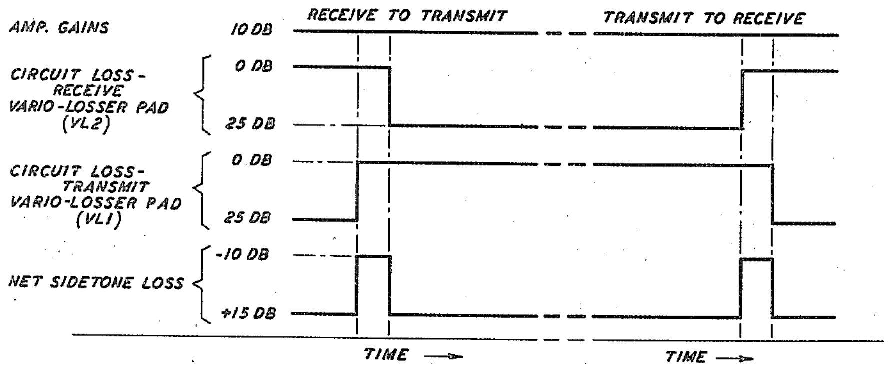
Figs. 2 and 3 show curves respectively illustrating the sequence of switching operations in the system of Fig. 1 which would result in objectionable switching transients and a sequence of switching operations which will reduce such switching transients.
Figure 3:
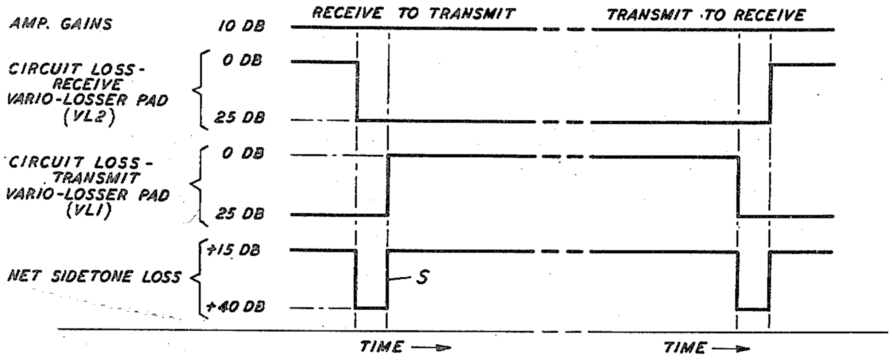

The sequence of vario-losser pad operations or restorations when switching the set from the transmitting to the receiving condition or vice versa, is extremely important as shown by the appropriately labeled loss-time and gain-time curves of Figs. 2 and 3. If, in going from the transmitting to the receiving condition, the high loss (25 decibels) is removed from the receiving circuit RC before the high loss (25 decibels) is reinserted in the transmitting circuit TC, as indicated by the right-hand curves of Fig. 2 a momentary net circuit gain of 10 decibels exists in the sidetone path instead of the normal net attenuation of 15 decibels. As a result, the room noise applied by the transmitter T to the transmitter circuit TC is momentarily amplified, instead of attenuated, before reaching the receiver R, causing a momentary increase of 25 decibels in the received sidetone level. If, in going from the receiving to the transmitting condition, the high loss (25 decibels) is removed from the transmitting circuit TC before the high loss (25 decibels) is inserted in the receiving circuit RC, as indicated by the left-hand curves of Fig. 2 a similar momentary net circuit gain of 10 decibels exists in the sidetone path. As a result, during the switching operation in either direction, the receiver R produces a momentary loud burst of sidetone which is very unpleasant to the operator. These switching transients may be substantially removed by adjusting the time constants of the signal-controlled switching circuit CL so that the vario-lossers VL1 and VL2 are operated in the sequence indicated by the curves of Fig. 3, in which, relative to the transmit vario-losser VL1, the receiving vario-losser VL2 is fast operate and slow release. With the sequence of operations, the sidetone is momentarily attenuated to an abnormally high degree to produce the brief "slots" S, which are scarcely noticeable, much less objectionable.

Figure 4:
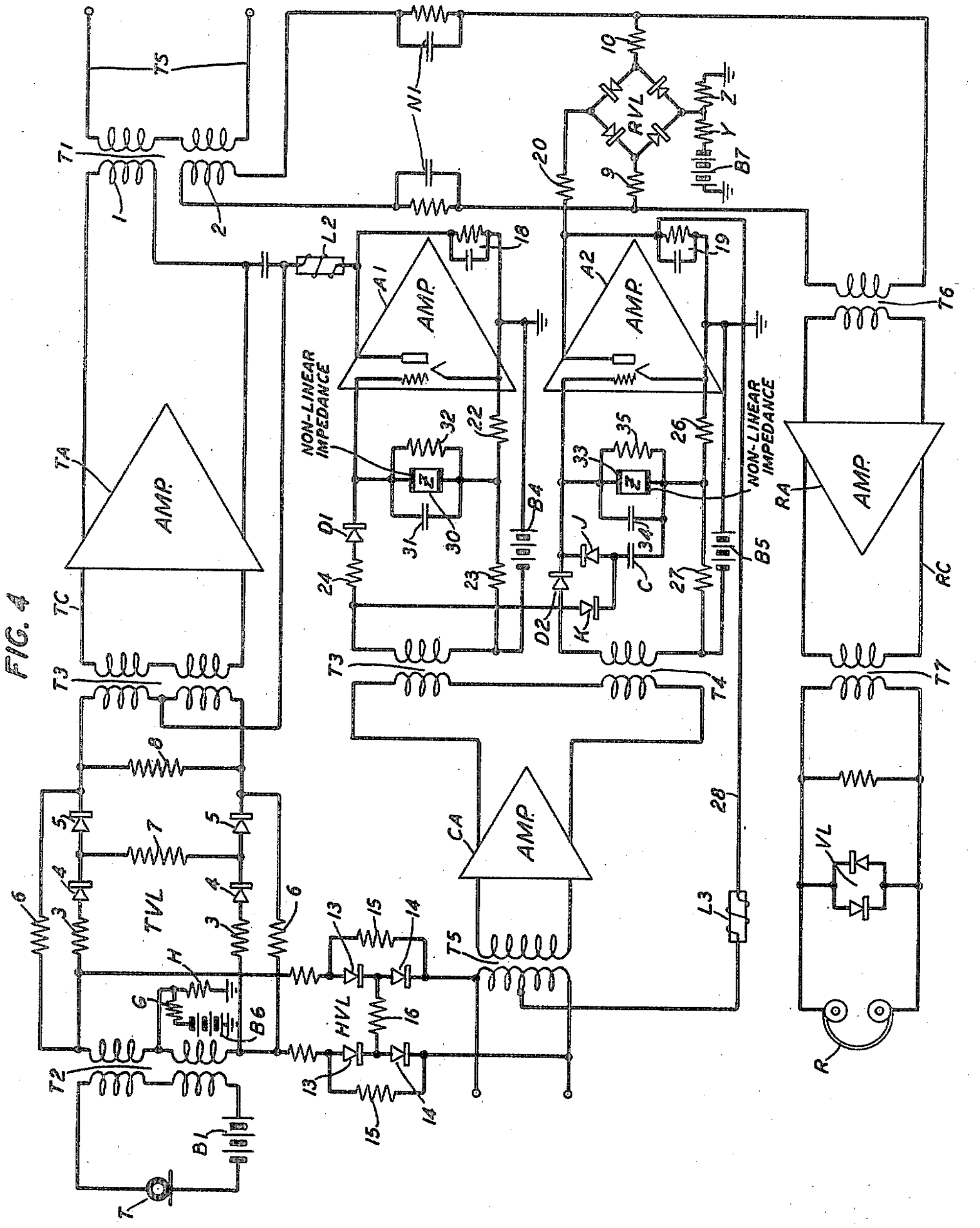
Fig. 4 shows schematically a known type of voice-operated operator's telephone set modified in accordance with the invention.

One arrangement of the invention for attaining the desired time constants for vario-losser operation and release in accordance with the invention so as to prevent objectionable transient disturbances in the signal transmission paths when switching between the transmitting and receiving conditions, is shown in Fig. 4 in connection with a voice-controlled operator's two-way telephone set similar to that disclosed in the United States Patent No. 2,332,430, issued October 19, 1943, to U. S. Berger.

In the voice-controlled operator's telephone set similar to that shown in the aforementioned Berger patent, shown in Fig. 4, only those parts necessary to explain the operation of the arrangement of the invention have been illustrated and described in detail, the other portions of the Berger arrangement being either illustrated by appropriately labeled boxes or eliminated entirely in order to simplify the description.

The operator's telephone circuit of Fig. 4 includes the voice transmitting branch TC and the voice receiving branch RC, coupled by the three-winding transformer T1 to a two-wire terminating section TS which is adapted for connection in any suitable manner to a selected telephone line.

The voice transmitting branch includes in order reading from left to right, telephone transmitter T and associated energizing battery B1, the transmitting vario-losser pad TVL and the transmitting amplifier TA having its output connected to one winding 1 of the transformer T1. The voice receiving branch RC which has its input connected to a second winding 2 of transformer T1 includes the frequency characteristic-correcting networks N1 in its input followed by the receiving vario-losser pad RVL, the receiving amplifier RA and the telephone receiver R.

The transmitting vario-losser pad TVL comprises a short section of line coupled by the transformers T2 and T3 between the transmitter T and the amplifier TA with a network comprising a linear resistor 3 and two non-linear elements, each of which may comprise a copper-oxide type rectifier, 4 and 5 in series, shunted by a linear resistor 6, connected in series with each side of the line section, and the linear resistors 7 and 8 shunted across the line section at the points indicated. The receiving vario-losser pad RVL comprises a bridge having a copper-oxide rectifier poled as indicated in each of its four arms, and one diagonal (horizontal) connected in series with the linear resistors 9 and 10 across the receiving branch RC in front of the receiving amplifier RA.

The control circuit CL for the vario-losser pads TVL and RVL has its input connected across the secondary winding of transformer T2 in the voice transmitting branch TC. It includes in its input the "delayed operate" vario-losser pad HVL followed by an alternating current amplifier CA; two independent detector circuits respectively including the copper-oxide rectifiers D1 and D2, having their inputs connected by transformers T3 and T4, respectively, to the output of the amplifier CA; a direct current amplifier A1 having its input connected to the output of the detector circuit including detector D1 and its output circuit including plate battery (ground, since negative battery is used) and the resistance-condenser network 18 in series, connected via the transmitting vario-losser TVL across the mid-points of the secondary winding of transformer T2 and the primary winding of transformer T3 to the tap on the voltage divider G, H; and a direct current amplifier A2 having its input connected to the output of the detector circuit including detector D2 and its output circuit including plate battery (ground), the resistance-condenser network 19 and the resistor 20 in series connected across the vertical diagonal of the receiving vario-losser RVL to the voltage divider Y, Z. Each direct current amplifier A1 and A2 may comprise a single amplifying vacuum tube having three or more electrodes, as indicated diagrammatically.

The vario-losser HVL in the input of the control circuit CL comprises a network consisting of two series copper-oxide rectifiers 13 and 14, shunted by a linear resistor 15, in each side of that circuit, and a linear resistor 16 shunted across the circuit between the rectifiers. The vario-losser HVL is connected from the output of the direct current amplifier A2 by a direct connection 28 from the plate of the amplifier tube through the retardation coil L3 to the mid-point of the primary winding of the input transformer T5, and the two halves of that winding, and from the two halves of the secondary winding of the input transformer T2 to the voltage divider G, H.

A network comprising a varistor 30, condenser 31 and a linear resistor 32 in parallel, is connected in common to the output circuit of the detector D1 and the input circuit of the direct current amplifier A1, and a similar network comprising the varistor 33, the condenser 34 and the linear resistor 35 in parallel, is connected in common to the output circuit of the detector D2 and the input circuit of the direct current amplifier A2. Varistors 30 and 33 may each comprise a block of a material composed of silicon carbide crystals and an insulating binder (kaolin), commercially known as "Thyrite," which is disclosed in the United States Patent 1,822,742, issued September 8, 1931, to K. C. McEachron.

The varistors J and K operating as asymmetric impedance devices, which may be copper-oxide rectifiers or any other non-linear resistance elements of the unidirectional type, and the capacitor C, in combination with the varistor-capacitor-resistor arrangements 30, 31, 32 and 33, 34 and 35 in the input of the direct current amplifiers A1 and A2, respectively, are utilized to provide suitable time constants for the control of the vario-lossers TVL, RVL and HVL to accomplish the purposes of the invention in a manner which will be described later in connection with the complete decription of the operation of the circuit of Fig. 4. The varistor J and the capacitor C in series are connected across the input of the direct current amplifier A2 on the output side of the detector D2, the varistor J being poled in opposition to the detector D2; and the varistor K is connected between the upper terminal of the secondary winding of transformer T3 on the input side of detector D1, and a point between the varistor J and the capacitor C, and is poled in the same direction as the varistor J. Also, the secondary winding of the transformer T3 is transposed with respect to the secondary winding of the transformer T4 for a purpose which will be brought out in the following complete description of the operation of the circuit of Fig. 4. Other elements of the circuit of Fig. 4 will be described later in connection with the following description of operation.

Normally, that is, when there is no speech input to the control circuit CL, the direct current amplifiers A1 and A2 are biased beyond the cut-off point and, since there is essentially no voltage drop across the resistors in the resistance-condenser networks 18 and 19 resulting from plate current flow, the plate of each of these amplifiers approaches ground potential. It will be noted that the vario-losser pad RVL in the receiving circuit RC is interposed between the plate of the direct current amplifier tube A2 and a potentiometer comprising the resistors Y and Z; that the vario-losser pad TVL in the input of the transmitting circuit TC is interposed between the plate of the direct current amplifier tube A1 and a potentiometer comprising the resistors G and H; and that the vario-losser pad HVL in the input of the control circuit CL is interposed between the plate of the direct current amplifier tube A2 and the potentiometer made up of resistors G and H. The potentials at the junction of the potentiometer resistors Y and Z and at the junction of the potentiometer resistors G and H are more negative than the potentials at the plate terminals of the direct current amplifier tubes A1 and A2, so that negative biasing voltages are applied to the rectifiers in the vario-losser pads TVL, RVL and HVL causing each of them to exhibit a high resistance characteristic. Since the vario-losser pad RVL is connected in shunt with the receiving circuit RC, the normal loss inserted in that circuit by the vario-losser pad is a minimum. On the other hand, the rectifiers in the vario-losser pads TVL and HVL are in series with the transmitting circuit TC and the control circuit CL, respectively, so that these vario-losser pads normally provide a maximum loss in the circuits in which they are connected. Thus, any waves applied to the transmitting circuit TC or the control circuit CL when the operator is not talking will be highly attenuated whereas any waves including voice signals from a distant party received over the line connected to the two-wire terminating section TS, will be highly amplified in the receiving circuit RC.

When the operator talks into the transmitter T, a portion of the resulting voice currents will pass through the input transformer T2 to the transmitting vario-losser TVL in transmitting circuit TC and to the input of the control circuit CL. The portion passing into the control circuit CL will be attenuated in the vario-losser pad HVL which at the time provides a high loss in the input of the control circuit CL. The attenuated voice currents in the output of the pad HVL will be impressed by the transformer T5 on the input of the control amplifier CA which will amplify them in accordance with its gain setting.

A portion of the amplified voice signals in the output of the control amplifier CA will be impressed by the transformer T3 on the detector circuit including detector D1 and the other portion will be impressed by the transformer T4 on the detector circuit including the detector D2. The rectified signal outputs of the detectors D1 and D2 will build up potentials across the capacitors 31 and 34, respectively. Owing primarily to the presence of the resistor 24 in series with the detector D1, the potential across the capacitor 31 rises less rapidly than that across the capacitor 34. At the same time, the capacitor C will be charged through the varistor K by the signals in the output of the transformer T3 to essentially the same potential as the capacitor 34. The varistor J, because of its opposite poling, operates as a high resistor between the output of the detector D2 and the capacitor C during the charging period and assures the independence of the charging paths of the capacitors 34 and C. This is required to permit a sufficiently rapid potential rise across the capacitor 34. Hence the charging time of capacitor 34 with the capacitor C in the circuit is substantially the same as it would be if the capacitor C were not present. The connection of the varistor K to the upper terminal of the secondary winding of transformer T3, instead of to the upper terminal of the secondary winding of the transformer T4, effectively eliminates the common resistance of the transformer winding so as to provide maximum isolation of the charging circuits of the capacitors 34 and C. The transposition for the secondary winding of transformer T3 with respect to the secondary winding of transformer T4 causes the detector D2 and the varistor K to operate on opposing half cycles of the alternating current wave supplied from the output of the control amplifier CA and thus contributes to the faster operation (charging) of the circuit of the direct current amplifier A2 than that of direct current amplifier A1.

The resistors 23, 22 and the resistors 27, 26 constitute voltage dividers between the battery B4 and ground, and between battery B5 and ground, respectively. The potential drops across resistors 23 and 27 are applied across detectors D1 and D2, respectively, as negative detector bias. The potential drops across resistors 22 and 26 provide negative grid biases for the direct current amplifiers A1 and A2, respectively. By proper selection of the resistance values for the potential dividers, the bias applied to the direct current amplifier tube A1 may be made somewhat greater than that applied to the direct current amplifier tube A2. The direct current potential developed across capacitors 31 and 34 by the rectified speech currents overcomes the negative biases, thus allowing plate current to flow through the direct current amplifier tubes A1 and A2, respectively. Since the rise of potential across capacitor 31 is slower than that across capacitor 34, and since the negative bias applied to the direct current amplifier tube A1 is somewhat greater than that applied to the direct current amplifier tube A2, plate current flow through A2 is insured in advance of that through direct current amplifier tube A1. As a result, the potential between the plate of tube A2 and ground caused by plate current flow through the resistor in the resistance-condenser circuit 19 increases in advance of the corresponding increase in the potential between the plate of tube A1 and ground caused by plate current flow through the resistor in the resistance-condenser circuit 18 in the output of tube A1. The circuit is so designed that, with plate current flow in the direct current amplifier tubes A1 and A2, the potential between ground and either plate is greater than the voltage across resistor H or Z. Thus, the potentials across the rectifiers in the vario-lossers TVL, RVL and HVL are reversed in polarity and reduce the impedance of these rectifiers. Consequently, the series resistances 6 and 15, in the vario-losser pads TVL and HVL, respectively, are shunted by low resistance paths so as to reduce the loss values of these pads to their minimum values determined by the value of the shunt resistors 7, 8 and 16, respectively, of these pads; and the vario-losser RVL provides a very low impedance shunt across the circuit RC so as to provide maximum desired loss in that circuit.

Under the above-mentioned vario-losser pad conditions, the loss in the transmitting circuit between the operator's transmitter T and the transmitting amplifier TA is greatly reduced. This effectively increases the gain in the voice transmitting branch TC for the operator's voice currents which are amplified by amplifier TA and then passed through transformer T1 and two-wire section TS to the connected line, while effectively reducing the gain of the voice receiving circuit RC so that the transmission of sidetone energy through the latter circuit is not increased. The input of the receiving amplifier RA is essentially in parallel with the line and hence the high loss in the receiving circuit RC is required to maintain the sidetone level to the operator at a satisfactory value. The transmitting vario-losser pad TVL largely determines the room noise sidetone level to the operator whereas the receiving pad of vario-losser pad RVL largely determines speech sidetone level.

Owing to the time sequence inherent in the operation of the detector circuits D1 and D2 as described above, the high loss is inserted in the receiving circuit RC by the vario-losser pad RVL and the high loss in the input of the control circuit CL is removed by the vario-losser pad HVL before the high loss is removed in the transmitting circuit TC by the transmitting vario-losser pad TVL. As explained in connection with the curves of Figs. 2 and 3, this sequence of operation is necessary to prevent a transient which would arise during the operating interval of the control circuit CL if the high loss condition of the transmitting vario-losser pad TVL were removed before the high loss is inserted in the receiving circuit RC by the receiving vario-losser pad RVL. The low loss condition of the vario-losser pad HVL in the input of the control circuit CL produced by operation of the latter circuit in the manner described above, increases the sensitivity of the control circuit CL during the interval that the transmitter unit T is actuated by the operator's voice. This increased sensitivity insures the holding of the transmitting vario-losser pad TVL and the receiving vario-losser pad RVL in the off-normal condition over a wide variation in speech levels some of which may be of lower intensity than occasional room noise peaks. In this way the HVL vario-losser permits operation under somewhat higher peak conditions of room noise without affecting the ability of impressed speed to maintain the control circuit in its off-normal condition.

When the operator ceases talking and the inputs to the detectors D1 and D2 in the two detector control branches of the control circuit CL are removed, the voltages built up across the capacitors 31 and 34 in the load cicuits of these detectors will be discharged through the associated circuits. In the load circuit of the detector D1, the capacitor 31 will discharge through the resistor 32 and the varistor 30. As this discharge occurs, the potential between the grid and cathode of the direct current amplifier vacuum tube A1 decreases accordingly to reduce the plate current through that tube. As the plate current through tube A1 decreases, the potential between its plate and ground will also decrease. When the capacitor 31 has discharged sufficiently, the potential from the plate of tube A1 to ground will become smaller than the voltage drop across the resistor H. At this moment, the bias on the transmitting vario-losser pad TVL becomes negative and increases the impedance of that pad. The restoration time of the detector load circuits is determined primarily by the values of resistance and capacitance in these circuits. The characteristics of the silicon carbide varistor 30 or 33 used are such that its resistance is a direct function of the voltage across it. Hence, the varistor tends to maintain constant detector characteristics in spite of voltage variations caused by relatively wide differences in sound level input. When no speed input is present, the associated detectors may develop a small voltage from background noise inputs. If the gain through the control amplifier CA is correctly adjusted with respect to the detector and amplifier biases, this voltage will be insufficient to alter the operation of the circuit as described above.

While the circuit of the detector D1 is restoring to normal, similar action occurs in the circuit of detector D2 and its associated receiving vario-losser pad RVL and control circuit vario-losser pad HVL. In the latter case, the capacitor 34 discharges through the resistor 35 and the varistor 33. However, as the potential across capacitor 34 decreases, an incremental positive bias is developed across varistor J owing to the charge on the capacitor C. As a result, the capacitor C discharges through the varistor J and in parallel with capacitor 34 through resistor 35 and varistor 33. It should be noted that the capacitor C is arranged to charge independently of capacitor 34, but to discharge in parallel with it so as to increase the time constant of the circuit on discharge. By this arrangement, the voltage for causing operation of the direct current amplifier A1 under control of the detector D1 is made to build up more rapidly than the voltage for causing the operation of the direct current amplifier A2 under control of the detector D1 but to decay more slowly. As a result, the receiving vario-losser pad RVL and the control circuit vario-losser pad HVL losses are switched prior to the transmitting vario-losser pad loss during the operate interval but are restored subsequently to the removal of the transmitting vario-losser pad loss during the restoration interval. The object of this pad switching sequence is to maintain the high loss of at least one vario-losser pad in the sidetone circuit at all times. If this sequence is destroyed, a switching transient will occur during operation, restoration or both. When the receiving vario-losser pad RVL and the control circuit vario-losser pad HVL are restored to the conditions in which they provide low loss and high loss, respectively, in the circuits in which they are connected, the operator's telephone set has returned to normal. The addition of varistors J and K with capacitor C, therefore, materially increases the discharge time constant without appreciably affecting the charging time constant (operate) so as to produce a fast operate, slow release condition for the vario-losser control circuit associated with detector DC.

The retardation coil L3 in the lead 28 connecting the plate of the direct current amplifier A2 to the mid-point of the primary winding of transformer T5 is used to isolate the simplex control circuit of the vario-losser pad HVL from audio frequency components present in the plate circuit of the direct current amplifier tube A2. The retardation coil L2 in the connection between the plate of the direct current amplifier tube A1 and the mid-point of the primary winding of transformer T3 performs a similar function between the transmitting vario-losser pad TVL and the plate circuit of the direct current amplifier tube A1. The arrangement VL comprising two oppositely poled non-linear resistors in parallel, connected across the receiver R is provided to limit the maximum level output from the receiving circuit RC. The circuits NI in the input of the receiving circuit branch RC are provided to increase the high frequency response to speech sidetone. The resistors 9 and 10 in the circuit connecting the vario-losser pad RVL in shunt with the input of the receiving circuit RC are given suitable values to provide the desired speech sidetone loss through the resistors of the circuits NI.

Various modifications of the circuit illustrated and described which are within the spirit and scope of the invention will occur to persons skilled in the art. For example, the switching circuits may be arranged to suitably control the gains of the amplifiers in the transmission paths instead of separate loss devices therein to suitably control the relative losses of these paths.

What is claimed is:

1. In a signal transmission system, a two-way line, two oppositely-directed one-way transmission paths for respectively transmitting signals to and receiving signals from said line, means normally providing a high transmission loss in one of said paths, means normally providing a low transmission loss in the other of said paths such as to allow substantially free transmission of signals thereover, switching means comprising two switching branches having a common input circuit fed from said one path near its input, one of said branches being operatively responsive to the signal energy applied thereto through said common input circuit when signals are impressed on the input of said one path to reduce the loss therein to a relatively low value such as to allow substantially free transmission of the impressed signals over that path, and releasing in response to cessation in the impressed signals to restore said one path to its normal high loss condition, the other of said branches being operatively responsive to the signal energy applied thereto through said common input circuit when signals are impressed on the input of said one path to increase the loss in said other path to a relatively high value, and releasing in response to cessation in the impressed signals to restore said other path to its normal low loss condition and means to reduce transient disturbances introduced in said paths when signal transmission is switched from one path to the other by the operation or release of said switching means comprising means for making the relative operate time constants of the two switching branches such that in response to the signals impressed on said one path said other switching branch operates before said one switching branch and means for making the relative release time constants of said two switching branches such that in response to cessation in the signals impressed on said one path said one switching branch releases before said other switching branch.

2. A telephone set comprising line terminals, a voice signal transmitting circuit and a voice signal receiving circuit each including amplifying means, connected to said line terminals, means normally providing a high loss in said transmitting circuit and a low loss in said receiving circuit, such as to condition said set normally for signal receiving only, a control device connected to said transmitting circuit in front of the loss means therein, said control device comprising two control branches respectively responsive to outgoing voice signals applied to the input of said transmitting circuit to switch the normal high loss out of that circuit and a high loss into said receiving circuit so as to condition said set for signal transmitting only, and responsive to cessation in the supply of outgoing signals to said transmitting circuit to return the loss means in said transmitting and receiving circuits to their normal high loss and low loss conditions, respectively, and means to reduce transient disturbances introduced in said circuits while switching said set from the transmitting to the receiving condition or from the receiving to the transmitting condition comprising means for making the control branch for switching loss into said receiving circuit relatively fast operating compared with the control branch for switching loss out of said transmitting circuit and means for making the control branch for switching loss into said receiving circuit slow releasing compared with the control branch for switching loss out of said transmitting circuit.

3. The telephone set of claim 2, in which each of said control branches includes similar capacitor means adapted to be charged in response to the applied voice signals to control the associated losses, and to be discharged in response to cessation in the applied voice signals, so as to control the time constants of the respective control branches, and the last mentioned means comprises auxiliary means for materially increasing the discharge time of the capacitor means in the control branch for switching high loss into said receiving circuit without appreciably affecting the charging time of that capacitor means.

4. A telephone set comprising line terminals, separate voice signal transmitting and voice signal receiving circuits, each including amplifying means, connected to said line terminals, variable loss means in front of the amplifying means in each of said circuits, the variable loss means in said transmitting circuit being normally adjusted to introduce a high loss therein and the variable loss means in said receiving circuit being normally adjusted to introduce a very small loss therein, a control device fed from said transmitting circuit at a point in front of the variable loss means therein, said control device being operatively responsive to the voice signals applied thereto from said transmitting circuit to adjust the variable loss means therein so that it introduces a very low loss to outgoing signals and thus effectively increases the gain of that circuit, and to adjust the variable loss means in said receiving circuit so that it introduces a high loss therein and thus effectively reduces the gain of the latter circuit, and means to reduce transient disturbances introduced in said circuits during the periods of adjustment of the variable loss means therein comprising means associated with said control device for controlling its time constants so that it operates in response to applied voice signals to adjust the variable loss means in said receiving circuit to the high loss condition before it adjusts the variable loss means in said transmitting circuit to the low loss condition, and in response to cessation in the applied voice signals releases in such manner as to restore the variable loss means in said transmitting circuit to its normal high loss condition before restoring the variable loss means in said receiving circuit to its normal low loss condition.

5. A telephone set comprising line terminals, a voice signal transmitting circuit and a voice signal receiving circuit, each including signal amplifying means, connected to said line terminals, a vario-losser in front of the amplifying means in each of said circuits, the vario-losser in the transmitting circuit being normally biased so as to introduce a high loss in that circuit and the vario-losser in the receiving circuit being normally biased so as to introduce a very small loss therein, a control circuit for the two vario-lossers connected to said transmitting circuit at a point in front of the vario-losser therein, said control circuit having two control branches each including a detector for detecting a different portion of the voice signals diverted into said control circuit when outgoing voice signals are applied to the input of said transmitting circuit, the detected signal output of one of said control branches being utilized to change the bias on the vario-losser in said transmitting circuit so that it inserts a very low loss in that circuit to the outgoing signals and the detected signal output of the other of said control branches being utilized to change the bias on the vario-losser in said receiving circuit so that it inserts a high loss in that circuit, the reduction in the detected signal outputs of said one and said other control branches with cessation in the application of voice signals to the input of said transmitting circuit respectively restoring to normal the biases on the vario-lossers in said transmitting circuit and said receiving circuit to reinsert said high loss in the former circuit and said low loss in the latter circuit, and means to reduce transient disturbances introduced into said transmitting and receiving circuits during the periods in which the loss values of the vario-lossers therein are being changed comprising means for making said other control branch fast operating and slow releasing relative to said one control branch.

6. The telephone set of claim 5, in which the means for changing the biases on the vario-lossers in said transmitting and receiving circuits includes a capacitor shunted by a resistor in the detector load circuit of each control branch, each capacitor being charged through the associated detector in response to the voice signals applied to the input of said transmitting circuit and being discharged through the resistor in shunt therewith when the voice signal input to said transmitting circuit ceases and the last-mentioned means comprises two asymmetric impedance devices, another capacitor connected in series with one of said asymmetric impedance devices across the capacitor and shunting resistor in the detector load circuit of said other control branch, means for separately charging said other capacitor through the other of said asymmetric impedance devices by the voice signals applied to said one control branch, said one asymmetric impedance device being so poled with respect to the detector in said other control branch as to isolate the charging circuit of said other capacitor from the charging circuit of the first capacitor in the detector load circuit of said other control branch, the discharge of said first capacitor through the resistor in shunt therewith in response to cessation in the signals applied to the input of said transmitting circuit applying a positive bias to said one asymmetric impedance device causing said other capacitor to be discharged through said one asymmetric impedance device to increase the discharge time constant of said other control branch with respect to that of said one control branch without appreciably affecting the charging time constant of either of the two branches.

7. A telephone set comprising line terminals, a voice signal transmitting circuit and a voice signal receiving circuit each including signal amplifying means, connected to said line terminals, variable loss means in front of the amplifying means in each of said circuits, a control device fed from the input of said transmitting circuit, a third variable loss means in the input of said control device, the variable loss means in said transmitting circuit being normally adjusted to introduce a high loss therein and the variable loss means in the receiving circuit being normally adjusted to insert a low loss therein so that said set is normally conditioned for signal receiving only, said third variable loss means in said control device being normally adjusted to provide a loss therein such as to appreciably reduce the sensitivity of said device, said control device being responsive to the portion of the outgoing signals applied thereto from the input of said transmitting circuit to adjust said variable loss means in said transmitting circuit so that it provides a low loss to the outgoing signals therein, to adjust the variable loss means in said receiving circuit so that it provides a high sidetone loss therein, and to adjust the variable loss means in said control device to reduce the loss therein and thus increase the sensitivity of that device, said control device being responsive thereto from cessation in the supply of voice signals to said transmitting circuit to restore the variable loss means in said transmitting and receiving circuits and in said control device to their normal loss conditions, and means to reduce transient disturbances in said circuits during the changing of the loss conditions of the variable loss means therein comprising auxiliary means associated with said control device for controlling its operation and release time constants so that during signal transmitting intervals the loss of the variable loss means in said receiving circuit is increased and the loss of the variable loss means in said control device is reduced before the loss of the variable loss means in said transmitting circuit is reduced, and at the end of each signal transmitting interval the high loss condition of the variable loss means in said transmitting circuit is restored before the low loss condition and high loss conditions of the variable loss means in said receiving circuit and in said control device, respectively, are restored.

JAMES N. WALTER.

REFERENCES CITED

The following references are of record in the file of this patent:

UNITED STATES PATENTS

| Number | Name | Date |
|---|---|---|
| 2,332,430 | Berger | Oct. 19, 1943 |